United States Patent [19]

Koltookian

[11] Patent Number: 4,640,401
[45] Date of Patent: Feb. 3, 1987

[54] VEHICLE CLUTCH LUBE CONTROL SYSTEM

[75] Inventor: Sarkis A. Koltookian, Waterloo, Iowa

[73] Assignee: Deere & Company, Moline, Ill.

[21] Appl. No.: 730,006

[22] Filed: May 2, 1985

[51] Int. Cl.[4] .................. F16D 13/72; F16D 13/74; F16D 25/00
[52] U.S. Cl. ............................ 192/85 R; 192/113 B
[58] Field of Search ............ 192/113 B, 113 R, 70.12, 192/85 R; 251/48, 63

[56] References Cited

U.S. PATENT DOCUMENTS

| 2,833,385 | 5/1958 | Peterson et al. | 192/113 B |
| 3,064,779 | 11/1962 | Christenson | 192/113 B X |
| 3,351,169 | 11/1967 | McIndoe | 192/113 B X |
| 4,520,992 | 6/1985 | Sheffer | 251/48 |
| 4,540,078 | 9/1985 | Wetrich | 192/113 B X |
| 4,557,363 | 12/1985 | Golan | 192/113 B |

Primary Examiner—Rodney H. Bonck
Assistant Examiner—Alan G. Towner

[57] ABSTRACT

A hydraulic control circuit controls flow of cooling or lube fluid to a pair of wet clutches, such as a traction clutch and a PTO clutch of an agricultural tractor. The control circuit intermittently and temporarily increases the lube flow as a function of the engagement states of the clutches. The control circuit includes a dual pilot-operated valve wherein one pilot is larger and receives clutch operating pressure. The smaller pilot receives system pressure via a check valve and fluid exits from the smaller pilot via a fluid restrictor.

4 Claims, 2 Drawing Figures

VEHICLE CLUTCH LUBE CONTROL SYSTEM

BACKGROUND OF THE INVENTION

This invention relates to a control system for controlling the flow of cooling and lube fluid through a torque-transmitting clutch.

In clutches, such as the traction or power-take-off (PTO) clutch on an agricultural vehicle, the clutch plates and discs are frictionally engaged. This friction generates heat and excessive heat can cause premature clutch wear and failure. For this reason, current production tractors, such as Deere 4-Wheel Drive Tractor Models 8450, 8650 and 8850, utilize hydraulically engaged wet clutches wherein cooled and filtered hydraulic oil is flowed through the clutch assembly. The cooling oil is flowed through these clutches continuously as long as they are engaged. However, energy is wasted when cooling oil flow is continued beyond the time when the excess heat has been removed from the clutch.

A system for providing intermittent lube flow is described in U.S. patent application Ser. No. 545,981, filed Oct. 27, 1983, now U.S. Pat. No. 4,540,078, (Attorney's File 12357) and assigned to the assignee of this application. However, this system in application Ser. No. 545,981, now U.S. Pat. No. 4,540,078, requires a complicated hydraulic circuit with many hydraulic valves and, therefore, would be expensive to produce.

SUMMARY OF THE INVENTION

An object of the present invention is to provide a simple, efficient and inexpensive intermittent clutch lube control system.

These and other objects are achieved by the present invention which includes a dual pilot-operated valve which opens and closes to control flow of lube fluid from a source to the lube circuits of a pair of torque-transmitting clutches. One of the pilots has a larger pressure-responsive area than that of the other pilot. The larger pilot is responsive to fluid pressure from an operator-controlled clutch opening valve. The smaller pilot is communicated to system pressure via a check valve and via a flow restrictor.

DETAILED DESCRIPTION

Figure 1:
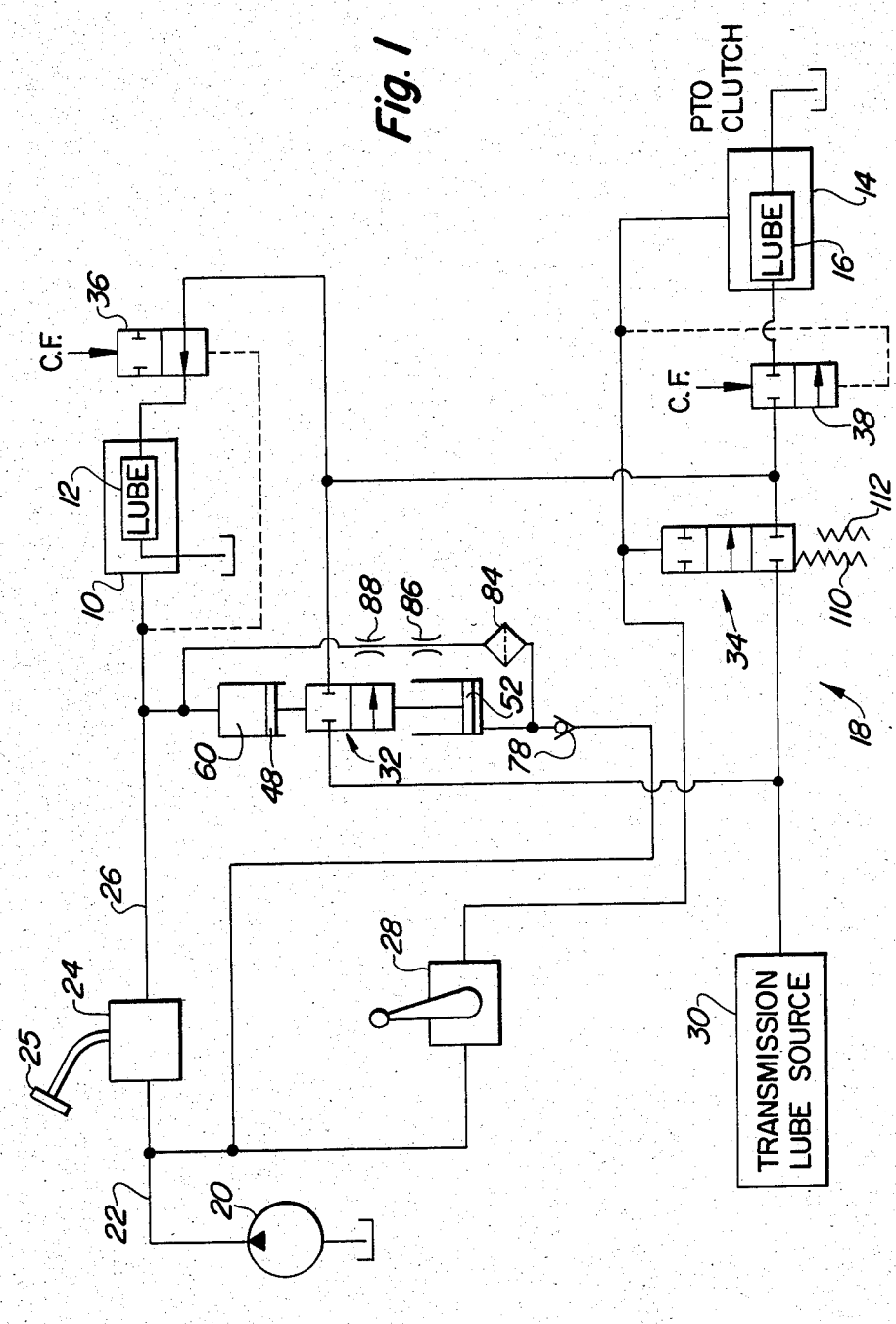
FIG. 1 is a schematic diagram of the applicant's clutch lube control system with the traction clutch engaged and the PTO clutch disengaged.

A conventional agricultural tractor (not shown) includes a conventional hydraulically-operated traction clutch 10 with a cooling or lubricating circuit 12 and a hydraulically-operated power-take-off (PTO) clutch 14 with a cooling or lubricating circuit 16. The clutches 10 and 14 and the lube circuits 12 and 16 are controlled by a control circuit 18.

Control circuit 18 includes a pump 20 which provides system pressure via line 22 to a conventional control valve 24 operated by pedal 25 which controls the operating pressure communicated to traction clutch 10 via line 26. Pump 20 also provides system pressure to control valve 28 which controls the operating pressure communicated to PTO clutch 14.

The control circuit 18 also includes a conventional lubricating oil source 30 for supplying lube oil to lube circuits 12 and 16 via clutch lube reduction delay valve 32 and a PTO lube reduction valve 34 and via conventional valves 36 and 38 which are opened by clutch operating pressure and which are closed by centrifugal force (C.F.).

Figure 2:
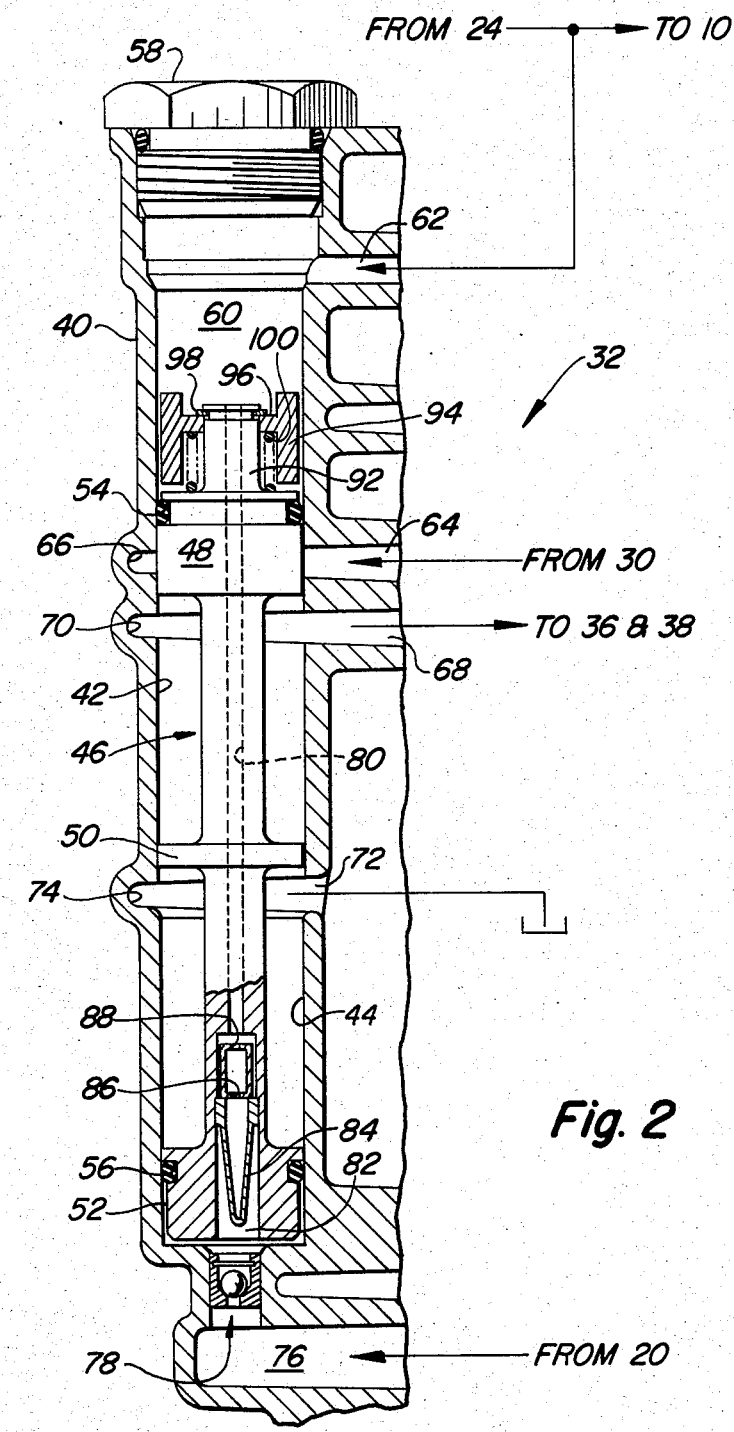
FIG. 2 is a detailed sectional view of a lube flow control valve of FIG. 1 with the clutch engaged.

Valve 32 is best shown in FIG. 2 and includes a housing 40 having a valve bore therein with larger and smaller diameter portions 42 and 44 which slidably and sealingly receive a hollow valve member 46. Valve member 46 includes lands 48, 50 and 52. Lands 48 and 52 have annular grooves which receive O-ring seals 54 and 56, respectively. Lands 48 and 52 operate as pressure-responsive pilots.

The end of housing 40 is sealed by plug 58, thereby defining a first pilot chamber 60 which is communicated with traction clutch operating pressure from valve 24 via passage 62. Inlet passage 64 and groove 66 communicate the valve bore 42 with lube oil from source 30. Outlet passage 68 and groove 70 communicate the bore 42 with lube circuits 12 and 16 via valves 36 and 38. Passage 72 and groove 74 communicate bores 42 and 44 with the reservoir.

Another end of valve bore 44 is communicated with system pressure from pump 20 via passage 76 and check valve 78. A bore 80 extends through valve member 46. A filter screen 84 and orifices 86 and 88 are mounted in the bore 80. Thus, valve 32 is a two-position, normally closed valve which is pressure-operated by traction clutch operating pressure acting on land 48 and by system pressure acting on land or pilot 52.

A stem 92 projects beyond land 48 towards plug 58. A hollow cylindrical member 94 is slidably mounted on stem 92 via a hollow radially inwardly extending flange 96 which slidably receives the stem 92. A snap ring or stop 98 retains member 94 on the stem 92. A spring 100 biases member 94 into engagement with snap ring 98 whereby there is a gap of approximately 3 mm between land 48 and member 94. The member 94 extends beyond the end of stem 92 so that when valve member 46 is moved towards plug 58, the plug 58 engages member 94 and moves it away from stop 98 to compress spring 100 until member 94 engages land 48.

Normally, the pressure from valve 24 is high, the traction clutch 10 is engaged and valve 32 is in its normally closed position, as shown, and no lube fluid flows to lube circuits 12 and 16. This is because the pressure in chamber 60 acts on the larger area of land 48 while system pressure from pump 20 acts on the smaller area of land 52.

As pedal 24 is initially depressed, there may be a small surge of lube flow because the lowered pressure in line 26 momentarily opens valve 32 a small amount while valve 36 remains open. Then when pedal 25 is fully depressed to completely disengage clutch 10, there is no lube flow because valve 36 will be closed even when valve 32 is open.

When pedal 25 is fully depressed, the pressure from valve 24 and in chamber 60 becomes low and the traction clutch 10 is disengaged and the system pressure acts on land 52 via check valve 78 to move valve member 46 upwards, viewing FIG. 2. Eventually, this upward movement will cause member 94 to engage plug 58, whereupon member 94 separates from stop 98 and spring 100 is compressed until land 48 engages the lower end of member 94, whereupon valve 32 will be open. However, there is still no lube flow to lube circuit 12 because valves 36 and 38 open only upon partial clutch or PTO engagement.

In this fully raised position of valve member 46, the compressed spring 100 exerts a downward force on the valve member 46. Then, when the pedal 25 is released to re-engage clutch 10 and the pressure in chamber 60 is back up to system pressure, this downward force from spring 100 aids in overcoming the static friction between seals 54 and 56 and the walls of bore portions 42 and 44 so that valve member 46 will quickly start to move downward and back to the position shown. This helps to prevent valve member 46 from sticking in high friction situations, such as low temperatures.

When chamber 60 reaches system pressure, the valve member 46 of valve 32 is urged downwards, viewing FIG. 2, since the area of land 48 is slightly larger than the area of land 52. This downward movement causes land 52 to move against system pressure, thus forcing fluid through screen 84 and orifices 86 and 88. Because of orifices 86 and 88, this downward movement is slow so that valve 32 closes after a delay. Thus, lube flow persists for a certain time period after re-engagement of the traction clutch until valve 32 returns to its normal fully closed position. The areas of lands 48 and 52 and the size of orifices 86 and 88 can be adjusted to control how long lube flow persists after clutch re-engagement.

This delay feature is beneficial in that extra lube flow is provided between multiple manual traction clutch engagements which reduces thermal clutch destruction. Lube cut-off after engagement increases efficiency. Furthermore, this system will tend to fail to a mode in which lube flow is provided since system pressure urges valve 32 to its open flow position.

In the case of PTO lube cut-off, the ability to cut off lube flow, whether the PTO clutch is engaged or disengaged, reduces the parasitic drag on the PTO clutch which is often disengaged for long periods.

Valve 34 is a three-position (off-on-off) valve which is urged to one of its off positions by spring 110 when the PTO clutch operating pressure from valve 20 is low, such as when the PTO clutch 14 is disengaged. When the pressure from valve 20 goes high to engage PTO clutch 14, this pressure moves valve 34 to its center open position whereby lube fluid from 30 is communicated to lube circuits 12 and 16 via valves 34, 36 and 38. Spring 112 only operates to resist the movement of valve 34 past the open center position in response to the high pressure from valve 20.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. In a vehicle having a fluid pressure operated torque-transmitting clutch having engaged and disengage states, a vehicle driven pump, a clutch lube circuit, a source of lube fluid, an operator-controlled control valve which receives system pressure from the pump and which provides a clutch operating pressure to the clutch, and a control system for controlling flow of lube fluid to the lube circuit, the improvement wherein the control system comprises:

a valve housing having a valve bore extending therein and having larger and smaller diameter bore portions, an end of the larger bore portion receiving clutch-operating pressure, an end of the smaller bore portion receiving system pressure from the pump, an inlet communicating the valve bore with the lube source and an outlet communicating the valve bore with the lube circuit; and a pressure-responsive valve member movable in the valve bore, the valve member comprising a first land sealingly slidable in the first larger bore portion and exposed to clutch operating pressure, a second land sealingly slidable in the second smaller bore portion and exposed to system pressure, one of the lands cooperating with a wall of the valve bore to control communication between the inlet and the outlet, and a stem interconnecting the first and second lands.

2. The control system of claim 1, further comprising:
a first fluid line connected between the pump and the end of the smaller bore portion;
a check valve in the first line for permitting one-way fluid flow from the pump;
a second line from the end of the smaller bore portion to the operator-controlled control valve; and
a flow restrictor in the second line.

3. The control system of claim 1, wherein:
the valve member has a passage extending therethrough and a fluid restriction is located in the passage.

4. The control system of claim 3, further comprising:
a fluid line communicating the pump with the end of the smaller bore portion; and
a check valve in the fluid line for permitting one-way fluid flow through the line from the pump.

* * * * *